INVENTOR
JEAN-MARC PIERRET
BY
J. Jancin Jr.
ATTORNEY

United States Patent Office 3,435,343
Patented Mar. 25, 1969

3,435,343 APPARATUS FOR CARRIER PHASE CORRECTION

Jean-Marc Pierret, Falicon, France, assignor to International Business Machines Corporation, Armonk, N.Y., a corporation of New York Filed Oct. 15, 1965, Ser. No. 496,443
Claims priority, application France, Oct. 16, 1964, 7,484
Int. Cl. H04b 1/12
U.S. Cl. 325—389 7 Claims

ABSTRACT OF THE DISCLOSURE

Apparatus for correcting phase distortion of a transmitted carrier. Readjustment signals which are functions of carrier phase distortion are generated in the receiver by successively mixing selected signals, preferably harmonically related, to determine a phase correction voltage. This voltage causes a counter to select a delay which is used to correct carrier phase errors. Phase error is corrected to a value equivalent to carrier phase delay in a linear equivalent channel. Input means isolates the carrier from the harmonically related signals and control signal generation means is responsive to the harmonically related signals to provide a composite signal to control phase distortion.

This invention relates to modulated carrier communication systems, and more particularly to an apparatus for reducing or eliminating carrier phase distortion resulting from distortions introduced in the transmission media.

Many transmission techniques require that the carrier be accurately recovered at the receiver to adequately demodulate the transmitted signal to recover the signal information. In such transmission systems carrier phase distortion introduced by the transmission media, if uncorrected, prevents proper demodulation at the receiver to recover the information.

A known means of compensating for such carrier phase error is to eliminate line distortion by known line equalization methods. This means of compensation has the disadvantage of requiring manual readjustments.

It is accordingly, an object of this invention to readjust the received carrier phase in an improved manner to compensate for phase distortion introduced by a transmission media.

It is another object of this invention to automatically compensate for carrier phase distortion.

It is still a further object of this invention to readjust for non-linear phase distortion of a carrier frequency by equivalent linear aproximations.

In accordance with the invention, the foregoing and other objects are achieved by modulating two transmitted carrier readjustment signal tones to determine a phase correction voltage. More specifically, intermediary signals, which are functions of the carrier phase distortion, are generated in the receiver by successively mixing selected signals to determine a phase correction voltage. This voltage causes a counter to select a discrete delay which, in turn, is used to correct carrier phase errors. The delay is selected such that the carrier phase error is corrected to a value equivalent to carrier phase delay in a linear equivalent channel.

The foregoing and other objects, features and advantages of the invention will be apparent from the following more particular description of a preferred embodiment of the invention, as illustrated in the accompanying drawings.

General description

Figure 1B:
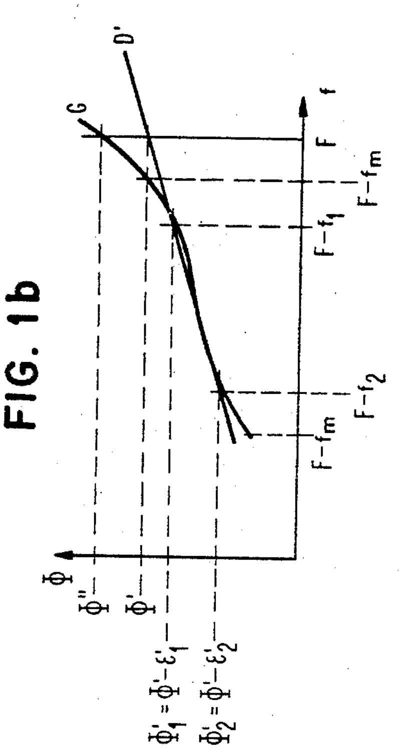
FIG. 1B represents a non-linear phase plot of a transmission channel with a superimposed linear representation of the same channel.
Figure 1A:
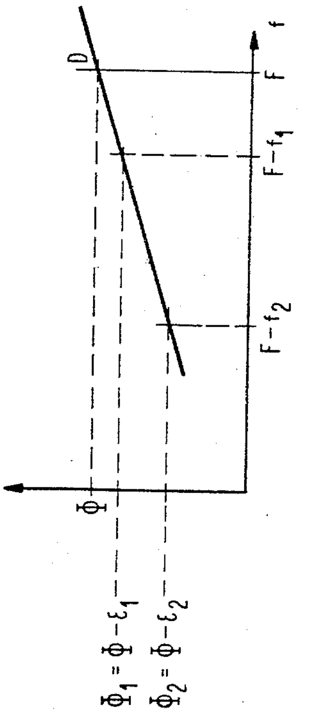
FIG. 1A represents a linear phase plot of a transmission channel.

FIG. 1A represents a linear channel having a linear relationship between phase and frequency which is represented by straight line D. In such a linear channel there corresponds to a frequency F a phase shift $\Phi$; to a frequency F minus $f_1$ a phase shift $\Phi_1$; and to a frequency F minus $f_2$ a phase shift $\Phi_2$. Under these conditions, the following equations apply:

(1) $$\Phi_1=\Phi-\epsilon_1$$

(2) $$\Phi_2=\Phi-\epsilon_2$$

And assuming that $f_2$ is an integral multiple of $f_1$, that is, $f_2=Kf_1$, there will be the same relation between $\epsilon_1$ and $\epsilon_2$ yielding:

(3) $$\Phi_2=K\epsilon_1$$

However, should the channel or line be non-linear, there will be a relation between phase and frequency such as is illustrated by curve G in FIG. 1B. In such a non-linear relationship, there corresponds to a frequency F a phase shift $\Phi''$; to a frequency $F-f_1$ a phase shift $\Phi_1'$; to a frequency $F-f_2$ a phase shift $\Phi_2'$. Such a non-linear relationship between phase and frequency may be approximated by a linear channel, often called an "equivalent linear channel," characterized in that the same phase shift exists for $F-f_1$ and $F-f_2$. Such an "equivalent linear channel" is represented by curve D' in FIG. 1B. Under the assumption of a linear representation of the non-linear phase shift, the following relations may be written:

(4) $$\Phi_2'=\Phi'-\epsilon_2'$$

(5) $$\Phi''=\Phi'+\Delta\Phi$$

(6) $$\Phi_1''=\Phi'-\epsilon_1'$$

$\Delta\Phi$, which represents the difference between the linear channel representation and the non-linear error introduced by the transmission media, is dependent on the manner in which curve D' is selected. Those skilled in the art will recognize that for a given non-linear relation between frequency and phase, such as curve G, a linear relationship, D' can be selected to minimize $\Delta\Phi$. Furthermore, for a selection of a linear relationship between $f_1$ and $f_2$ such as, for example, $f_2=Kf_1$, the following relationship can be written:

(7) $$\epsilon_2'=K\epsilon_1'$$

Figure 2:
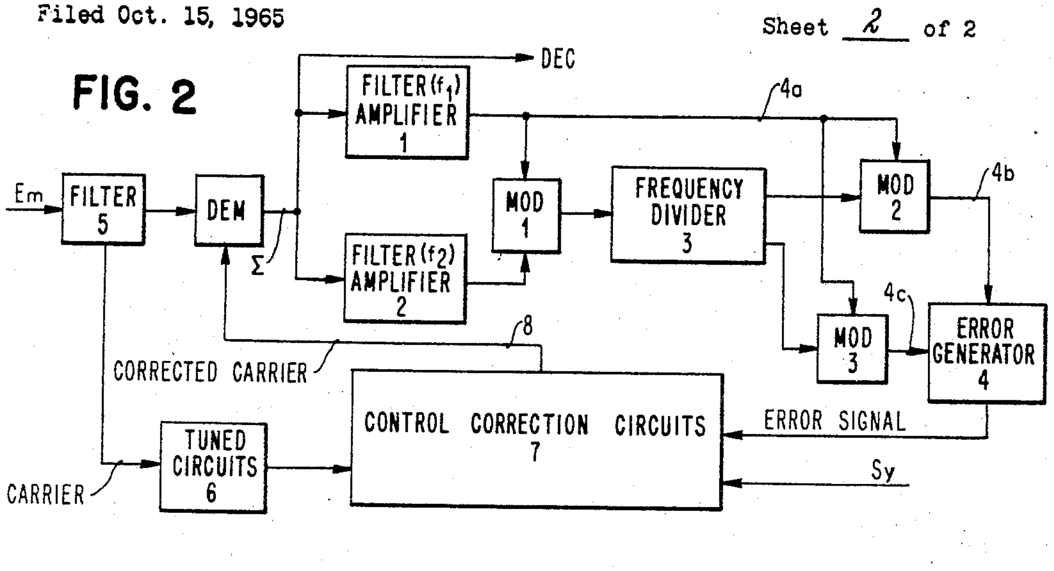
FIG. 2 shows a particular embodiment of the inventive carrier phase readjustment system.

The present invention provides a means for compensating for $\Delta\Phi$ such that the received carrier and signal can be adequately demodulated to derive the signal information. FIG. 2 discloses a phase correction system in accordance with the invention. The received signal E*m* is filtered by circuit 5 and applied to demodulator DEM. Demodulator DEM forms no part of the present invention; however, it is included in the description as it utilizes the corrected carrier signal 8. Circuits 1 and 2 are filters tuned, respectively, to frequency $f_1$ and frequency $f_2$. These filtered signals are then modulated by MOD 1 which combines $f_1$ and $f_2$. Frequency divider 3 receives the MOD 1 output and derives a signal related to $f_1$ by frequency division. Signal 4*a*, the output of filter 1, is fed to MOD 2 along with the output of frequency divider 3. Frequency divider 3 also generates a delayed signal functionally related to $f_1$ which is applied to MOD 3 along with singal 4*a*.

Continuing with FIG. 2, the mixed output $4b$ from MOD 2 and modulated output $4c$ from MOD 3 are applied to error generator 4. Signals $4b$ and $4c$ are functionally related to $\Delta\Phi$, the required phase distortion for correction of the carrier signal. Error generator 4 derives from these two signals or one of them, preferably $4b$, an error signal to control correcting circuit 7.

Modulators MOD 1, MOD 2, and MOD 3 operate in a conventional manner and may be designed by those skilled in the art to process the functions $f_1$, $Kf_1$, and $(K_{-1})$ $(f_1)$, which they are fed. Filter circuits 1 and 2 may be filters well known to those skilled in the art.

Control correction circuit 7 is timed in accordance with signal Sy such that a phase correction to the carrier is made at preselected intervals. Tuned circuit 6 separates the received carrier signal from input E*m* and applies it to control correction circuit 7 where the necessary phase correction is introduced. Corrected carrier signal 8 is applied to demodulator DEM to derive the information signal which is applied to the rest of the system as signal DEC.

Figure 3:
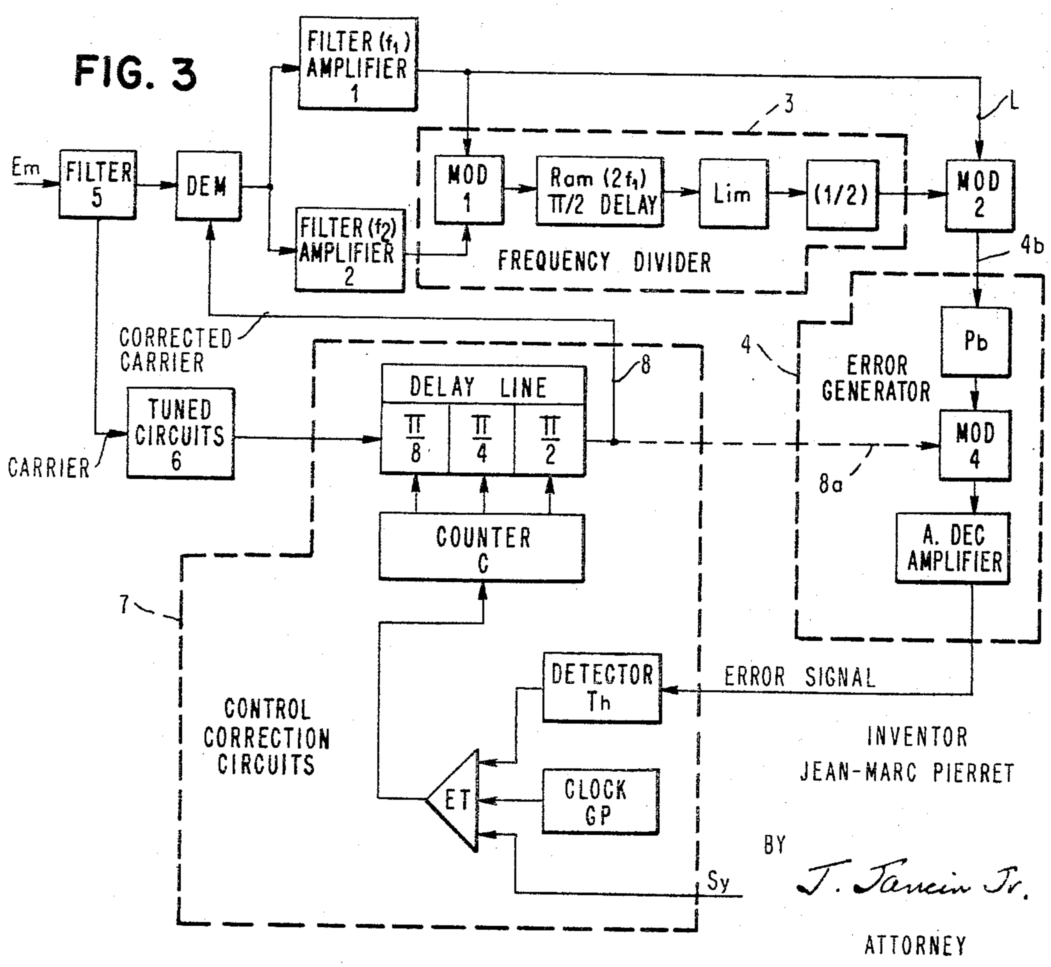
FIG. 3 is a more detailed representation of the embodiment shown in FIG. 2.

FIG. 3 shows a more detailed description of frequency divider 3, error generator 4 and control correction circuit 7 to better describe the invention. As shown in FIG. 3, the carrier and sideband signals are received as signal E*m* by filter 5. The carrier is passed on to phase corrector circuit 7 through a tuned amplifier 6. The signal sidebands are passed to demodulator DEM through filter 5. Circuit 1 is an amplifier tuned on the readjustment signal fundamental $f_1$ and circuit 2 is an amplifier tuned on the readjustment signal $f_2$. The resulting outputs of filter amplifiers 1 and 2 are combined in modulator MOD 1 whose output in turn is passed to frequency divider 3.

In the transmission example, for which the device is described, transmission coding is utilized such that the information is represented by a signal level change rather than by the signal level itself. Consequently, it is of no consequence that signal E*m* appearing at the receiving end is inverted. Therefore, carrier adjustment need only be done as a function of $\pi$. Furthermore, if conditions are such that signal deformation does not have any effect should the carrier have a phase shift less than $$\mp\frac{\pi}{8}$$

a phase shift between $\pi$ and $$\mp\left(\pi-\frac{\pi}{8}\right)$$

need not be readjusted. Therefore, it is sufficient to detect whether the carrier phase distortion $\Delta\Phi$ is found to be between $\pi/8$ and $$\left(\pi-\frac{\pi}{8}\right)$$

or between $$-\frac{\pi}{8}$$

and $$-\left(\pi-\frac{\pi}{8}\right)$$

Under these conditions, the output from modulator MOD 3 will be suppressed and consequently only the output from modulator MOD 2 is available to the error generator 4.

For the purposes of the present discussion, frequencies $f_1$ and $f_2$ have been chosen such that $f_2=3f_1$, causing the readjustment signals sent through to incorporate at least the fundamental and its third harmonic. The modulated output from MOD 1 is applied to amplifier R*am* which is tuned on frequency $2f_1$. The output of R*am* is delayed by $\pi/2$ and applied to limiter L*im* whose output, in turn, is applied to a frequency divider (indicated by one-half, which divides its input by a factor of 2.) Frequency divider output is applied to modulator MOD 2 along with signal L, the output from amplifier 1. Modulator output $4b$ from modulator MOD 2 is applied to low-pass filter P*b* in error generator 4. The output from low-pass filter P*b* is applied to modulator MOD 4 where it is combined with the corrected carrier signal $8a$ from control correction circuit 7. The modulated output from modulator MOD 4 is amplified and detected by circuit A. DEC.

Whenever the phase shift $\Delta\Phi$ reaches a value between $\pi/8$ and $$\pi-\frac{\pi}{8}$$

in absolute value, the output voltage from detector A. DEC is sufficient to precondition threshold detector T*h*. Signal Sy is provided to cause correction circuit 7 to operate only during a predetermined readjustment cycle. Signal Sy and an output from clock GP conditions AND circuit ET to deliver a pulse into counter circuit C. Counter C controls the delay line to delay the filtered carrier singal from tuned circuit 6 to provide the necessary carrier phase readjustment. Subsequent to a carrier phase adjustment, should a still greater phase shift remain, error generator 4 provides an error output which is sensed by detector T*h* to pass another pulse in to counter circuit C upon the next timing control signal Sy to cause the delay line to delay the distorted phase carrier by an amount $\pi/4$.

Those skilled in the art will recognize that the delay line in control correction circuit 7 may be designed to have delays other than $\pi/8$, $\pi/4$, $\pi/2$. . . . In addition, the delay line may be constructed to have additional delay increments other than those specifically set forth herein.

Figure 4:
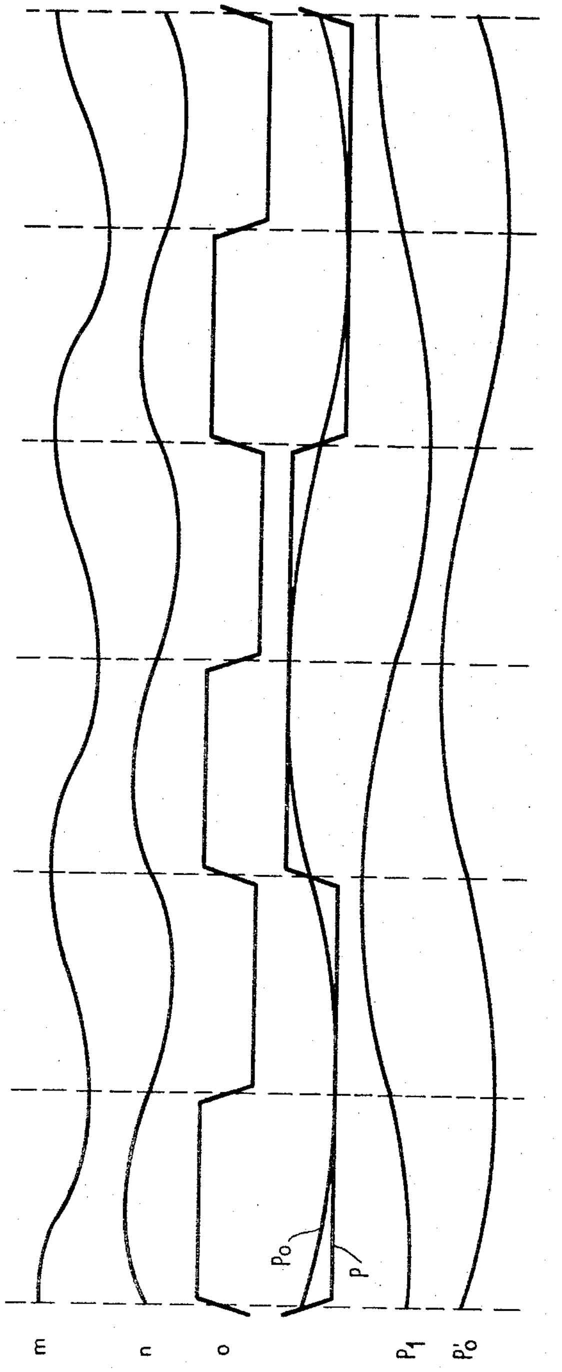
FIG. 4 shows the signal waveforms characteristic of the carrier phase readjustment device.

FIG. 4 shows some of the signal waveforms within frequency divider 3. Waveform *m* corresponds to the modulated output of MOD 1 which is fed to delay amplifier R*am*. The delayed signal is indicated by waveform *n*. The amplified and clipped output of amplifier R*am* is represented by waveform *o* which is the output of limiter L*im*. Signal *o* triggers a flip-flop (FIG. 3) which provides waveform P of frequency $f_1$ having a fundamental sinusoidal signal represented by waveform P*o*. Curve P*o* could have been obtained by a purely sinusoidal operation by dividing curve or waveform *m*. Curve $P_1$ is the same as waveform P*o* but advanced in phase by $\pi/2$. Curve $P_o'$ is identical to P*o* but delayed by $\pi/2$.

Operation

For a given transmission channel, two distinct frequencies $f_1$ and $f_2$ are chosen such that the "equivalent linear channel" approximates the true channel as closely as possible. This is indicated in FIG. 1B wherein frequencies $f_1$, $f_2$ are selected such that the "equivalent linear channel," represented by line D′, closely approximates the true transmission characteristic, represented by curve G, within the transmission band of interest.

Prior to the transmission of a given message through a given channel or line, a carrier readjustment signal comprising frequencies $f_1$ and $f_2$ is transmitted. Preferably, the readjustment signal includes a fundamental $f_1$ of the carrier frequency F and $f_2$ is selected to be a harmonic of frequency $f_1$. The signal wave form at the receiver may be expressed by the following equation:

$$A\sin(w-w_1)T+\Phi_1'+B\sin(w-Kw_1)T-\Phi_2' \quad (8)$$

where $w$ represents the radian frequency of carrier F. The carrier is expressed by:

$$C\sin(wT=\Phi'') \quad (9)$$

From Equations 1 through 7 and the above Equations 8, 9, the following relations may be written:

$$A\sin((w-w_1)\ T+\Phi'-\epsilon_1') + B\sin((w-Kw_1)T+\Phi'-K\epsilon_1') \quad (10)$$

which represents the signal waveform at the receiver.

$$C\sin(wT+\Phi'+\Delta\Phi) \quad (11)$$

which represents the carrier at the receiver.

The following function is obtained when the signal represented by Equation 10 is demodulated by the receiver:

$$(12)\quad \lambda 1 \cos (w_1 T+\epsilon_1'+\Delta\Phi)/\alpha + \lambda 2 \cos (Kw_1 T+K\epsilon_1'+\Delta\Phi)/\beta$$

Isolation of the $\alpha$ term (fundamental) and its harmonic represented by the $\beta$ term and subsequent recombination in a modulator yields the following expression:

$$(13)\quad \lambda 3 \cos ((K-1)\, w_1\, T+(K-1)\, \epsilon_1')$$

Frequency division of the expression represented in Equation 13 yields the following:

$$(14)\quad \lambda 4 \cos (w_1+\epsilon_1')$$

Delaying Expression 14 by $\pi/2$ yields:

$$(15)\quad \lambda 4 \cos \left(w_1 T+\epsilon_1'\frac{\pi}{2}\right)$$

Recombination of the $\alpha$ term of Expression 12 with expression 14 yields the following:

$$(16)\quad \lambda 5 \cos \left(\frac{\pi}{2}-\Delta\Phi\right)$$

Recombination of the $\alpha$ term in Expression 12 with Expression 15 yields the following:

$$(17)\quad \lambda 5 \cos \Delta\Phi$$

Expressions 16 and 17 are both functions of $\Delta\Phi$ which represents the difference between the received carrier phase $\Phi''$ and the phase $\Phi'$ represented by the "equivalent linear channel." Consequently, Expressions 16 and 17 may be used to correct the carrier phase at the receiver.

Equations 10–17 provide the necessary mathematical background for understanding the operation of the carrier readjustment system shown in FIGS. 2 and 3. With reference to FIG. 2, the output of the demodulator DEM is represented by Equation 12. The signal represented by Equation 13 is obtained by passing the output of the demodulator DEM through tuned circuits 1 and 2 and recombining their respective outputs in modulator MOD 1. The signal represented by Equation 14 is obtained from one of the outputs of frequency divider 3 by merely frequency dividing the output of modulator MOD 1. The signal represented by Equation 15 is also obtained from the other output of frequency divider 3 by providing a delay of $\pi/2$.

The function of $f_1$ taken from modulator MOD 1 input and represented by the $\alpha$ term of Expression 12 above is combined in modulator MOD 2 with the output of frequency divider 3 represented by expression 15 to yield the waveform represented by Expression 16. In a similar manner, the function of $f_1$ represented by the $\alpha$ term of Expresesion 12 is combined in modulator MOD 3 with the output of frequency divider 3 represented by Equation 14 to provide at the output of modulator MOD 3 a waveform represented by Expression 17.

It will be recognized by those skilled in the art that the outputs of modulator MOD 2 and modulator MOD 3 are signals that are functions of the phase distortion $\Delta\Phi$. Consequently, these signals may be isolated and used to develop control signals to provide the necessary phase correction to the distorted carrier frequency.

The function of error generator 4 is to examine either one, or both, of the signal outputs 4*b*, 4*c* from modulators MOD 2 and MOD 3, respectively, to generate a voltage indicative of the phase disparity $\Delta\Phi$. Such a voltage is obtained by error generator 4 by isolating the D.C. components of signals 4*b* and/or 4*c*. The control voltage output from error generator 4 is then applied to control correction circuits 7 in conjunction with a timing signal S*y* to alter the phase of the received carrier applied to correction circuits 7 via tuned amplifier circuits 6. The corrected carrier output 8 of control correction circuits 7 can then be applied to the receiver demodulator DEM to accurately derive the information from the filtered signal input.

A more detailed representation of frequency divider 3, error generator 4, and control correction circuits 7 is presented in FIG. 3. The function of frequency divider 3 is to generate a function of frequency $f_1$ from a signal function of frequency $f_2$. For the purposes of this invention, this is achieved by applying the output from modulator MOD 1 to amplifier R*am* which is tuned on frequency $2f_1$. It is to be noted that for the purposes of this description frequency $f_2$ is equal to the third harmonic of frequency $f_1$. The amplified output (waveform *n* of FIG. 4) is delayed $\pi/2$, by any delay device known to the art (not shown in FIG. 3) and applied to limiter L*im* which clips waveform *n* to develop waveform *o* of FIG. 4. Clipped output *o* is then provided to a flip-flop indicated by (1/2) in FIG. 3 to divide its frequency by a factor of 2. The resulting waveform is that of curve P shown in FIG. 4, which represents a signal of frequency F. It will be apparent to those skilled in the art that the waveform P of frequency $f_1$ could have been obtained by proceeding in a purely sinusoidal fashion, i.e., the output *n* of amplifier R*am* could have been frequency divided by beat frequency generation means known to the art to obtain a signal of fundamental frequency $f_1$.

Signal waveform P of FIG. 4 is combined in modulator MOD 2 with the $\alpha$ term of relation 12 via line L to generate a complex signal having a component as indicated in Equations 16 and 17. The complex signal is fed to low-pass filter P*b* in error generator 4 to isolate these aforementioned components. The resultant output of low-pass filter P*b* is combined in modulator MOD 4 with the corrected carrier frequency from control correction circuits 7 via signal 8*a*. The complex signal output from modulator MOD 4 is represented by Equations 16, 17. This signal is amplified and detected by amplifier-detector circuit A. DEC and provided to the control correction circuits 7.

As it is desirable to operate control correction circuits 7, only during a specific readjustment period, control correction circuits 7 are made operable by timing control signal S*y*. Whenever the carrier phase shift obtains a value between $\pi/8$ and $$\pi-\frac{\pi}{8}$$

in absolute value, the output voltage from amplifier-detector A. DEC preconditions threshold detector T*h*. Upon conditioning of AND circuit ET by the detector T*h* output, the clock pulse outputs from clock GP, and the timing control signal S*y*, a pulse is passed into counter C. Counter C then unshorts a portion $\pi/8$ of the delay line to phase shift the carrier signal. Should a still greater phase shift than $\pi/8$ remain subsequent to the carrier readjustment, the control voltage from amplifier-detector A. DEC will be sufficient to precondition detector T*h* which will enable clock GP upon the next timing signal S*y* to change counter C to unshort the $\pi/4$ portion of the delay line. In a corresponding manner, the carrier signal may be delayed by $\pi/8$, $\pi/4$, $3\pi/8$, $\pi/2$, $5\pi/8$, $3\pi/4$, and $7\pi/8$ which makes possible a carrier readjustment within $\pi$ radians. It will be apparent to those skilled in the art that the delay line need not be limited to the delays specifically set forth herein. Should the carrier be required to be readjusted to a finer threshold than $\pi/8$, the delay line could be designed to furnish intermediate delays in the carrier signal. The output of the delay line is provided to the receiver demodulator DEM via cable 8 and to modulator MOD 4 of the error generator 4 via cable 8*a*.

While the invention has been particularly shown and described with reference to a preferred embodiment thereof, it will be understood by those skilled in the art that various changes in form and details may be made therein without departing from the spirit and scope of the invention.

What is claimed is:

1. In a carrier frequency transmission system, carrier phase correction means, comprising:
   control signal generation means for receiving a carrier readjustment signal to derive phase correction control signals proportional to the amount of carrier phase distortion, said carrier readjustment signal containing at least two frequencies harmonically related to a fundamental carrier frequency whose phase is to be corrected, and said control signal generation means including at least one modulating means for combining the harmonic frequency signals of said carrier readjustment signal;
   carrier phase control correction means responsive to said phase correction control signal to readjust the phase of a fundamental carrier frequency to reduce phase distortion in the fundamental carrier frequency.

2. In a carrier frequency transmission system, carrier phase correction means, comprising:
   signal separation means for receiving a carrier readjustment signal, said carrier readjustment signal containing a plurality of signals harmonically related to a fundamental carrier frequency whose phase is to be corrected, said signal separation means serving to isolate individual ones of said plurality of harmonically related signals;
   first modultaing means responsive to the outputs of said signal separation means to produce a first composite signal functionally related to the amount of carrier phase distortion;
   second modulating means responsive to said first composite signal and to an individual one of said plurality of signals harmonically related to a fundamental carrier frequency to generate a second composite signal proportional to the amount of carrier phase distortion;
   error generating means responsive to said second composite signal to produce a carrier phase correction signal;
   carrier phase control correction means responsive to said carrier phase correction signal to readjust the phase of a fundamental carrier frequency to reduce phase distortion in the fundamental carrier frequency.

3. The carrier phase correction means of claim 2, wherein said error generating means further comprises:
   additional modulating means responsive to said second composite signal and a received carrier frequency to provide said carrier phase correction signal.

4. In a carrier frequency transmission system, carrier phase correction means, comprising:
   first modulating means responsive to a carrier readjustment signal containing a first and second signal harmonically related to a fundamental carrier frequency to combine said first and said second harmonic signals to produce a first composite signal;
   frequency divider means responsive to said first composite signal to generate a selected signal comprising frequencies of said first harmonic signal;

second modulating means responsive to said first harmonic signal and to said selected signal to generate a second composite signal characteristic of the phase distortion in a carrier frequency;
   error generating means for deriving from said second composite signal a carrier phase correction signal;
   carrier phase control correction means responsive to said carrier phase correction signal to readjust the phase of a carrier frequency to reduce phase distortion in the carrier frequency.

5. The carrier phase correction means as in claim 4, wherein said error generating means further comprises:
   additional modulating means responsive to said second composite signal and a received carrier frequency signal to provide said carrier phase correction signal.

6. In a carrier frequency transmission system, carrier phase correction means, comprising:
   signal isolating means to isolate a carrier frequency and at least two harmonically related carrier phase readjustment signals, said carrier being isolated from each said readjust signal;
   control signal generation means responsive to said harmonically related carrier phase readjustment signals to provide a composite signal characteristic of the phase distortion in said carrier frequency, said control signal generation means including modulating means responsive to the outputs of said signal isolating means;
   carrier phase control correction means responsive to said composite signal and to said carrier frequency to readjust the phase of said carrier frequency to reduce phase distortion in said carrier frequency.

7. In a carrier frequency communication system wherein a carrier is subject to non-linear distortion, a linear carrier phase distortion correction means, comprising:
   input means for receiving two pilot signals, said pilot signals characterized by a frequency harmonically related to said carrier and to one another;
   control signal generation means responsive to said pilot signals to generate a linear control signal characteristic of said non-linear carrier phase distortion, said signal generation means including modulating means connected to said input means;
   carrier phase control correction means responsive to said carrier and to said linear control signal to phase shift said carrier to reduce said non-linear phase distortion.

References Cited

UNITED STATES PATENTS

| | | | |
|---|---|---|---|
| 2,501,330 | 3/1950 | Hammond | 325—476 |
| 2,787,787 | 4/1957 | Earp | 325—476 |

KATHLEEN H. CLAFFY, *Primary Examiner.*

JAN S. BLACK, *Assistant Examiner.*

U.S. Cl. X.R.

325—418, 476